United States Patent [19]

Hartmeier et al.

[11] Patent Number: 5,535,481
[45] Date of Patent: Jul. 16, 1996

[54] TEXTILE MACHINE WITH A DRAFTING ARRANGEMENT INCLUDING ROTATIONAL POSITION SENSOR

[75] Inventors: Werner Hartmeier, Effretikon; Stefan Huppi, Baar, both of Switzerland

[73] Assignee: Rieter Machine Works, Ltd., Winterthur, Switzerland

[21] Appl. No.: 338,322

[22] Filed: Nov. 14, 1994

Related U.S. Application Data

[62] Division of Ser. No. 811,882, Dec. 19, 1991, Pat. No. 5,400,582, which is a continuation of Ser. No. 721,103, Aug. 2, 1991, abandoned, which is a continuation of Ser. No. 388,628, Aug. 2, 1989, abandoned.

[30] Foreign Application Priority Data

Aug. 5, 1988 [CH] Switzerland .................. 02975/88

[51] Int. Cl.⁶ .................................................. D01H 5/74
[52] U.S. Cl. .................................. 19/260; 19/236; 57/97
[58] Field of Search .................................. 57/264, 92, 97; 19/236, 237, 238, 239, 240, 256, 258, 260, 293

[56] References Cited

U.S. PATENT DOCUMENTS

| | | | |
|---|---|---|---|
| 4,314,388 | 2/1982 | Hartmannsgruber | 19/293 |
| 4,469,993 | 9/1984 | Swanson et al. | 318/561 |
| 4,807,430 | 2/1989 | Palmer | 57/18 |
| 5,022,123 | 6/1991 | Ueda et al. | 17/293 |
| 5,134,755 | 8/1992 | Jornot et al. | 19/239 |
| 5,248,925 | 9/1993 | Jornot et al. | 19/239 |
| 5,412,301 | 5/1995 | Jornot et al. | 19/239 |

FOREIGN PATENT DOCUMENTS

3926036 2/1990 Germany .................. 19/293

*Primary Examiner*—C. D. Crowder
*Assistant Examiner*—Larry D. Worrell, Jr.
*Attorney, Agent, or Firm*—McAulay Fisher Nissen Goldberg & Kiel

[57] ABSTRACT

In a textile machine with a drafting arrangement and textile spindles, the spindles are driven by an electric main drive. The drafting arrangement cylinders are coupled so that their speed is a given proportion of the speed of the main drive. The coupling is via a position-controlled brushless D.C. motor with electronic commutation for driving the drafting arrangement. An additional flywheel mass on the drafting arrangement drive is dimensioned so that the slowing-down time of the drafting arrangement is of the same order as the slowing-down time of the main drive, resulting in controlled slowing-down conditions if the voltage suddenly fails. The drafting arrangement motor can be made much smaller than hitherto. Also, the starting and slowing-down conditions can be accurately and sensitively controlled, thus reducing the risk of thread breakages.

1 Claim, 6 Drawing Sheets

TEXTILE MACHINE WITH A DRAFTING ARRANGEMENT INCLUDING ROTATIONAL POSITION SENSOR

This is a division of application Ser. No. 08/811,882, filed Dec. 19, 1991, now U.S. Pat. No. 5,400,582 which is a continuation of U.S. Ser. No. 07/721,103, filed Aug. 2, 1991, now abandoned which is a continuation of U.S. Ser. No. 07/388,628, filed Aug. 2, 1989, now abandoned.

The invention relates to a textile machine comprising a plurality of spinning positions each comprising a drafting arrangement and a spinning unit. The drafting arrangement may comprise elements common to several of the spinning positions.

Textile machines containing a drafting arrangement can, for example, be ring spinners, roving frames, funnel or cap spinning frames, air jet spinning frames, or the like. The drafting arrangement is used for drawing a sliver to a required thickness for delivery to the spinning unit and thus has to be operated as accurately as possible.

The initial twisting of a yarn or thread after leaving a drafting arrangement or the speed of subsequent winding onto a spool must be very accurately adjusted to the driving speed of the drafting arrangement in order to avoid irregularities in the yarn or broken threads or deviation from the thread thickness.

It is particularly critical to adjust the driving speed of a drafting arrangement to the speed of the spindles in the spinning unit on a ring spinner, since the natural dynamics of the spindle, rotating at high speed, and the geometry of the thread running onto the spindle (the thread balloon) must not be disturbed by irregularities in the stand running off the drafting arrangement. The adjustment must be exactly maintained during all phases of operation while a spinning position is producing thread, i.e., during run-up and slowing-down.

It is known to adjust the drafting arrangement speed to the speed of twist formation by providing mechanical and electric coupling components between two drive parts. The mechanical coupling parts comprise gears, usually with exchangeable sets of gearwheels, for adaption to various grades of yarn or other production conditions. An electric coupling is known e.g., from U.S. Pat. No. 4,336,684 and corresponding German patent 29 11 378, according to which the speed control is effected by inverter-fed synchronous motors with variable frequency. The timing frequency for the power supply is generated by a reference clock generator and a number of frequency-divider stages. Depending on the set speed, the corresponding set frequency is converted, in accordance with the known characteristic of the motor, into a three phase voltage suitable for supplying the motor. Since the frequency can be divided only in whole-number stages, the known means cannot eliminate a residual error in the angular position between the individual drives, and consequently an error in speed.

The known three-phase motor is a synchronous or asynchronous motor having to some degree, a known voltage/frequency characteristic. Owing to the small pull-out torque of a motor of this kind, the rated power of the motor has to be substantially equal to the torque required on starting. However, due to the relatively large number of mechanical bearings and frictional resistances inside a drafting arrangement, the starting torque can be relatively large compared with the torque during normal operation. In ring spinners, for example, drive motors for the drafting arrangement are designed for a rated power of 5 W per spinning position. This requires a motor power of 5 kW in a machine with 1000 spinning positions.

The known coupled drafting arrangement drives have the disadvantage of the aforementioned relatively high rated power of the driving motor, the expensive frequency/voltage control and the absence of a emergency device for controlled switching off if the voltage suddenly fails. In known machines of the aforementioned kind, a voltage failure results in uncontrolled slowing down, which will cause a large number of breaks in the thread, when or before the machine starts up again.

Improvements are also needed in the normal starting and switching-off conditions in the aforementioned textile machines, since relatively large numbers of threads are broken through torsional vibrations, particularly on long drafting arrangements.

As is known, a drafting arrangement of a spinning machine usually comprises a plurality of cylinders (commonly three in a ring frame and four in a roving frame). The cylinders define a plurality of drafting zones of which one is usually the main drafting zone in which the greater part of the draft is performed. The rotational relationships of the cylinders of the drafting arrangement are essential to operation of the arrangement as a whole. Errors in these relationships are the immediate cause of faults in a yarn spun from the drafted strand because it is not possible to eliminate drafting errors between the drafting arrangement and the spinning unit (spindle or other twist imparting element). This also applies especially in relation to the two cylinders defining the main drafting zone and/or to the cylinders in the delivery region. This is because the main (and critical) speed differential is found between the cylinders defining the main drafting zone, i.e. the zone with the highest draft, and the highest cylinder revolutions are found in the delivery region.

Accordingly, it is one object of the invention to improve the motor control of a drafting arrangement in dependence upon a spinning unit of a textile machine.

It is another object of the invention to improve the control of a drafting arrangement drive in dependence upon the operation of a main drive for a spinning unit and a textile machine.

Briefly, the invention provides a textile machine which has a spindle for winding a thread into a package, a main drive for driving the spindle, a drafting arrangement for supplying a thread to the spindle and a drafting arrangement drive for driving the drafting arrangement in synchronism with the main drive.

In accordance with the invention, the drafting arrangement drive includes a position controlled brushless D.C. motor drivingly connected to the cylinder of the drafting arrangement and a controller having integrated electronic commutation connected to the motor for actuating the motor to drive the cylinder in a given ratio to the speed of the main drive.

The main advantage of drive arrangement is the controlled slowing-down conditions if the current suddenly fails, and the accurately and sensitively controllable starting and slowing-down conditions. Finally, a considerably smaller motor can be used for driving the drafting arrangement, with a rated power of e.g. only a third of the stated power of motors on known machines of this kind. There is a further advantage in the case of particularly long textile machines, e.g., where a drafting arrangement cylinder extends for 30 to 40 meters.

Although suggestions have already been made to divide the cylinders, the speed of the drafting arrangement can be synchronized with the speed of the main drive in a particularly simple, accurate and reliable manner by the arrangement, so that the improvements for long cylinders are also considerable.

The invention may be specifically incorporated in a spinning machine comprising a row of spinning units, each of which is adapted to spin a yarn from a fiber strand delivered thereto and a drafting arrangement for delivering drafted fiber strands to the spinning units. This drafting arrangement includes a plurality of cylinders associated with each of the spinning units.

In accordance with the invention, at least one of the cylinders is driven in use by a motor having a feedback loop between its output and input such that at least one predetermined output characteristic of the motor is regulated in use according to a determinable set value. The output characteristic may be the output rpm (revolutions per minute) of the motor shaft. The characteristic is, however, preferably the angular position of the shaft.

The motor may drive all cylinders of the drafting arrangement, suitable mechanical linkages being provided between the cylinders to ensure the desired rotational relationships between then. Preferably, however, the motor drives only a single cylinder of the arrangement. In the preferred system, at least two cylinders are driven by respective motors as defined above. In such a case, at least one of the two essential drive motors is a position-controlled motor, i.e. a motor which is associated with a control system such as to maintain the angular disposition of the motor output shaft within a predetermined tolerance (error) of a position defined by a control system.

Where two position-controlled motors are provided, they are preferably used to drive the cylinders of the main drafting zone. Where only one position-controlled motor is provided, it is preferably controlled in the slave mode in a master-slave configuration where the master-motor is a revolutions-controlled motor driving the delivery cylinder of the relevant draft zone.

These and other objects and advantages of the invention will become more apparent from the following description taken in conjunction with the accompanying drawings wherein.

The following examples describe the preferred application of the motor control to a ring spinner, since the advantages of the motor control are particularly evident in this machine due to the sensitive cooperation between the drafting arrangement and spindle or rotor of the ring spinner. Of course, this example is not limitative, but the motor control provides basically the same advantages for other textile machines with drafting arrangements.

Figure 1:
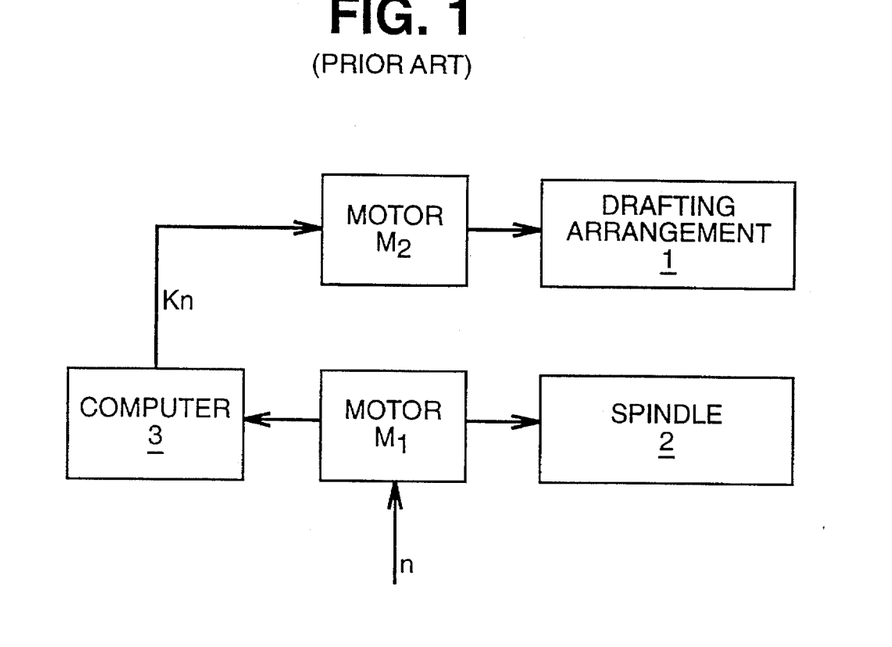
FIG. 1 is a simplified block circuit diagram of the relevant components of a known ring spinner.

FIG. 1 is a diagram of a drafting arrangement 1 from which a drafted fiber strand is spun by a spindle 2 to form a yarn which is wound onto a yarn package (or cop) (not shown). The spindle 2 is driven by a main drive, i.e., a motor $M_1$, at a speed n, whereas the drafting arrangement 1 is driven by a motor $M_2$ at a speed $K_n$ dependent on the main drive. The motor $M_2$ is speed-controlled, and the speed ratio is preset in a master computer 3 on the basis of specific data such as spinning parameters. Instead of the electric derivation of speed for the drafting arrangement drive $M_2$ as shown, the drafting arrangement 1 can also be driven by the spindle motor $M_1$ itself, via a mechanical transmission gear.

Figure 2:
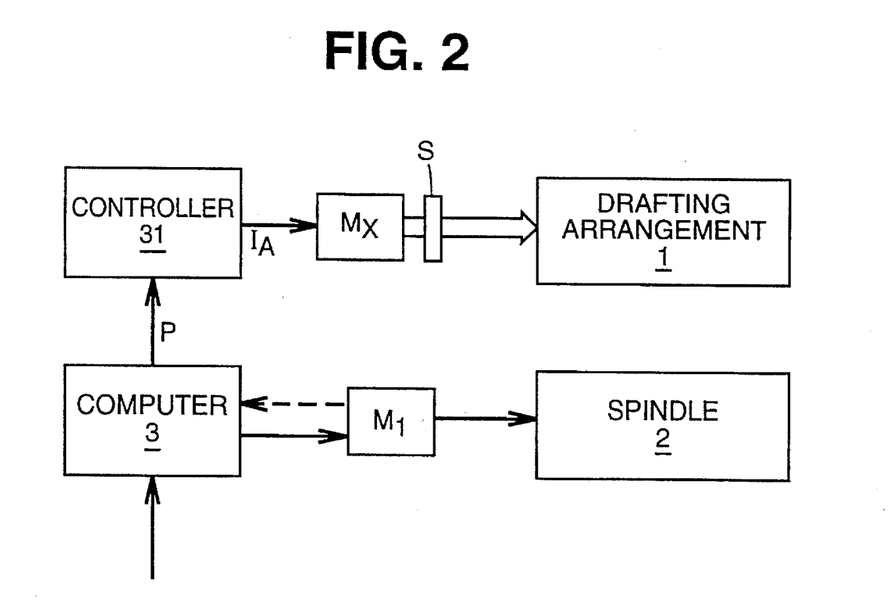
FIG. 2 is a block circuit diagram of the relevant components on a ring spinner according to the invention.

Referring to FIG. 2, wherein like reference characters indicates like parts as above, the drafting arrangement drive includes a controlled brushless D.C. motor $M_x$ comprising a flywheel mass S incorporated with or disposed on a shaft of the motor $M_x$ and a controller 31 with integrated electronic commutation to energize the motor $M_x$. The controller 31 is shown here as a functional unit and represented in detail in FIGS. 3, 4 or 5. The controller 31 receives a set speed value signal P from an overriding master computer 3.

Figure 3:
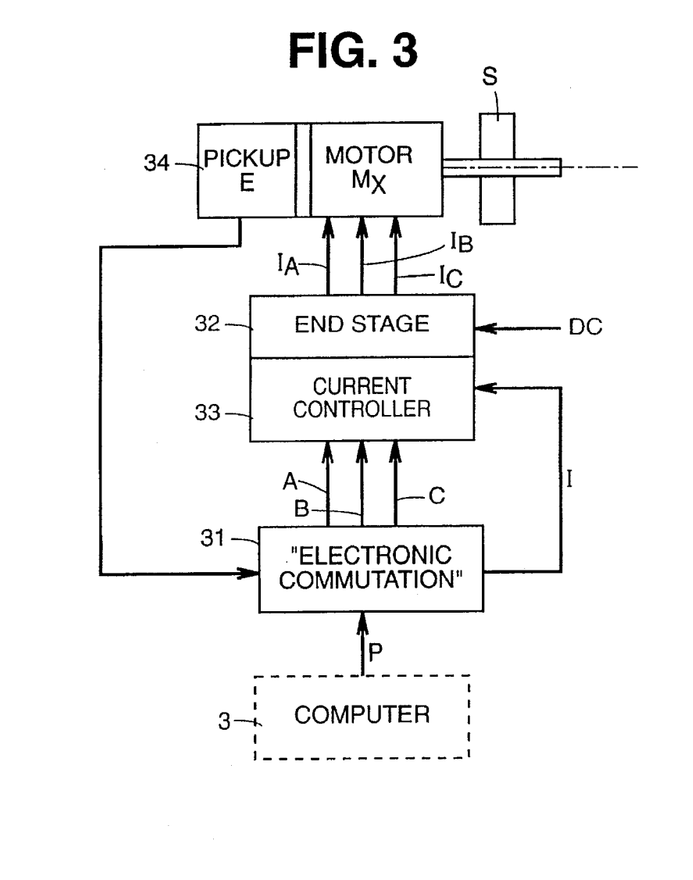
FIG. 3 illustrates one embodiment of an integrated motor control in accordance with the invention.

Referring to FIG. 3, the controller 31 is in the form of a digital position controller 31 with electronic commutation which receives a set position signal P preset by hand or by an overriding computer 3 and compares it with an actual position signal derived from the position-controlled drafting arrangement drive motor $M_x$, e.g., via a digital position pick-up 34 secured to the shaft of the motor $M_x$. The position controller 31, depending on the shaft position, first generates coordination signals A, B, C for electronic commutation of the alternating current to direct current. The controller 31 also calculates a set current signal I from a comparison of the actual position signal with the set position signal P. This signal I is supplied to a current controller 32 which uses it, via an end stage 33 receiving, D.C. current to derive the controlled phase currents $I_A$, $I_B$, $I_C$ for the motor $M_x$.

The motor $M_x$ is a brushless D.C. motor or servomotor, which has much better starting-up characteristics than conventional synchronous or reluctance or asynchronous motors. More particularly, a brushless D.C. motor can be briefly overloaded to a multiple of its rated torque, and for a time which is longer than the typical starting-up times (e.g., 5 seconds) for textile machines. This means that the rated load of the motor need not be chosen mainly in accordance with the initially-mentioned high starting torque; the rated power of the motor can be that required for normal operation and short overloading during the starting-up phase for obtaining a higher starting torque will be well within conventional power limits.

In practice, the drafting arrangement drive motor on a ring spinner for serving 1000 spinning stations need not be a 5 kW reluctance motor but can be a brushless servomotor with electronic commutation and a rated power of only 1.5 kW. This motor, during a typical starting-up time of about 5 seconds, can be overloaded by 350% to obtain the required starting torque. The maximum speed of the motor is fixed at 6000 rpm.

In conjunction with the electronic commutation and the digital position pick-up 34 in FIG. 3, the drafting arrangement drive has an extremely high accuracy of position without lag errors, such as occur e.g. in asynchronous motors or reluctance motors energized via a frequency divider as initially mentioned.

Direct dynamic control is particularly advantageous in conjunction with the additional shaft flywheel mass S. In the example of a ring spinner having the aforementioned size, the slowing-down time of the machine is about 10 seconds. If the additional flywheel mass S on the shaft of the drafting arrangement drive motor $M_x$ comprises e.g. an iron disc 200 mm in diameter and about 3 mm thick per 100 spinning stations, i.e. 30 mm thick per 1000 spinning stations, the combined inertia of the flywheel mass, the shaft and the other moving masses of the drafting arrangement are sufficient through mechanical mass moment of inertia alone to give a slowing-down time equal to the slowing-down time of the main drive, i.e. of the spindle drive in the example. Consequently, even if the current suddenly fails, the drafting arrangement drive can be kept synchronized with the spindle drive during the slowing-down. This feature greatly reduces the risk of broken threads if the voltage unexpectedly fails.

It has been found advantageous if the controller 31 is an integrated position controller with electronic commutation, e.g. the integrated switching circuit type HCTL-1000 sold by Hewlett-Packard. A controller of this kind can control the position in a particularly simple but accurate manner without the least risk of torsional vibrations.

A control system of this kind in conjunction with the aforementioned servomotor is a very direct system with extremely good dynamic properties which, in conjunction with the drafting arrangement, forms a well-matched drive unit.

Figure 4:
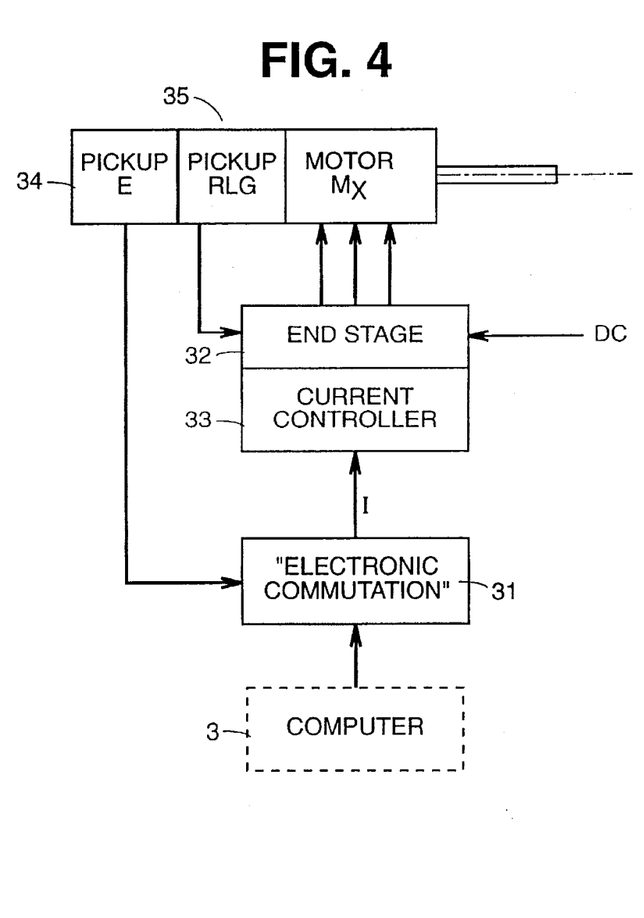
FIG. 4 illustrates another embodiment of a motor control in accordance with the invention.

FIG. 4 shows a variant of the controller in FIG. 3, in which an additional shaft position pick-up 35 is provided on the motor $M_x$ with an output acting on a controller end stage with commutation. As in the example in FIG. 3, the end stage is supplied with a set signal I for the motor current, the signal being readjusted with respect to the position of the motor shaft.

Figure 5:
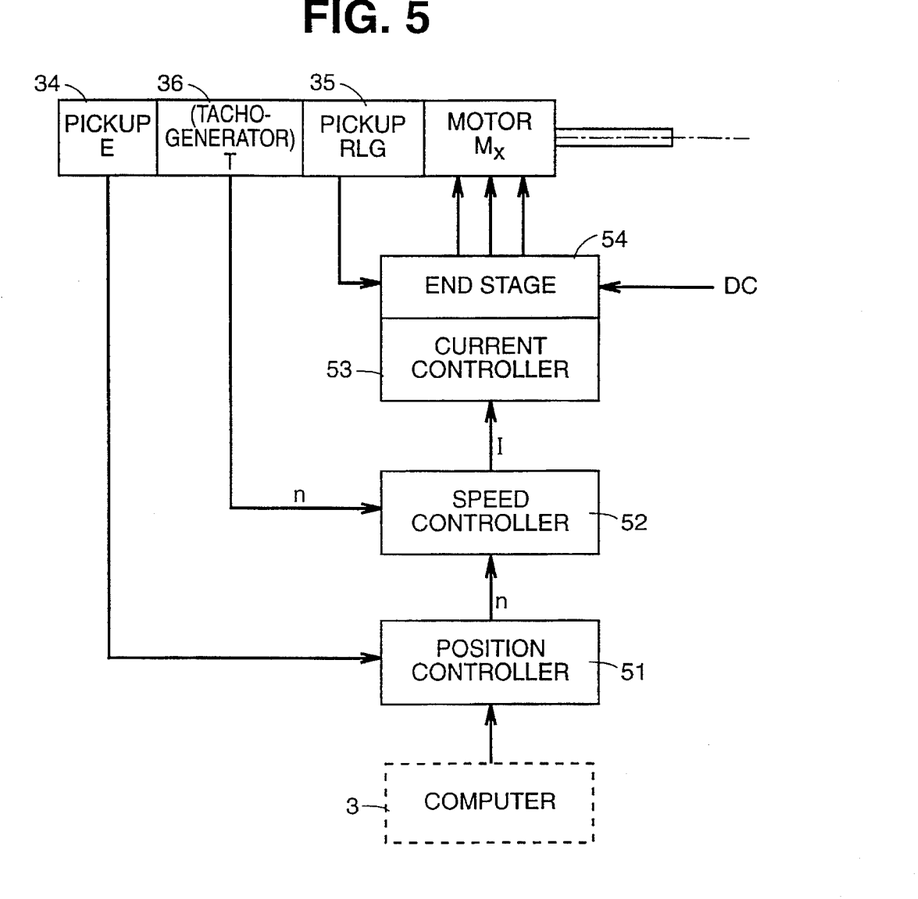
FIG. 5 illustrates a third embodiment of a motor control in accordance with the invention.

Referring to FIG. 5, a tachogenerator T (36) may also be provided on the motor $M_x$ in order to detect the actual speed of the motor shaft. In this embodiment, a set position signal is delivered from a computer 3 to a position controller 51 while an actual position signal is delivered from the first pick-up 34. The two signals are compared within the controller 51 to obtain a set speed signal corresponding to a deviation in position of the motor shaft. The resulting set speed signal n is delivered to a speed controller 52 which compares the signal with an actual value signal from the tachogenerator T and derives a set current signal I for actuating the end stage 54 via a current controller 53.

If the cylinders of a drafting arrangement of this kind exceed a certain length, mechanical torsional vibration of the cylinders will become unpleasantly noticeable, even if the position of the drive motor $M_x$ is accurately controlled. In order to eliminate such vibration, the drafting arrangement is driven by a motor at each end.

Figure 6:
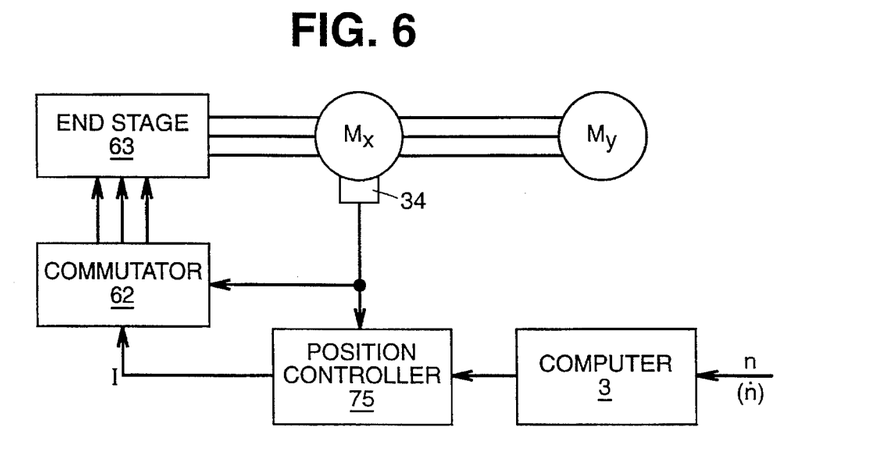
FIG. 6 shows an embodiment of a motor control for drive motors connected in series on the same drafting arrangement.
Figure 7:
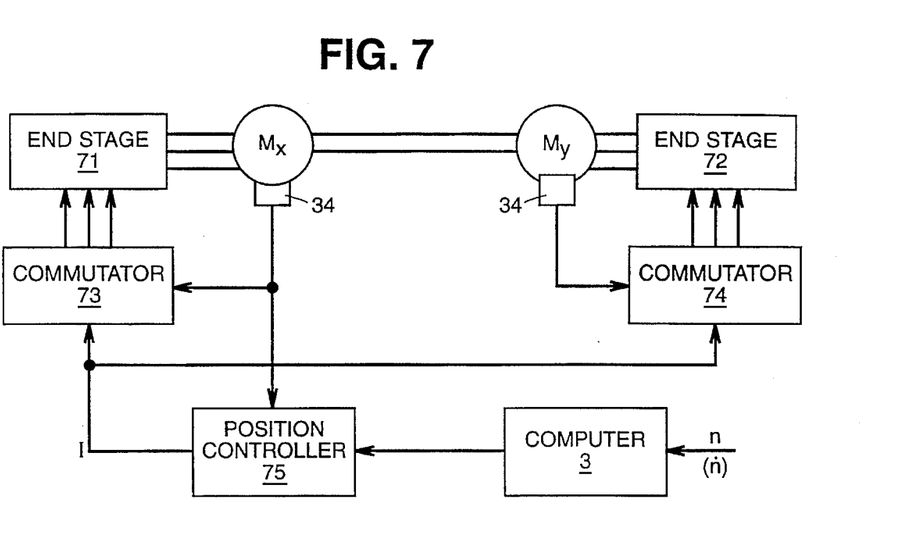
FIG. 7 shows an example of a master-slave control for two motors on a drafting arrangement.
Figure 8:
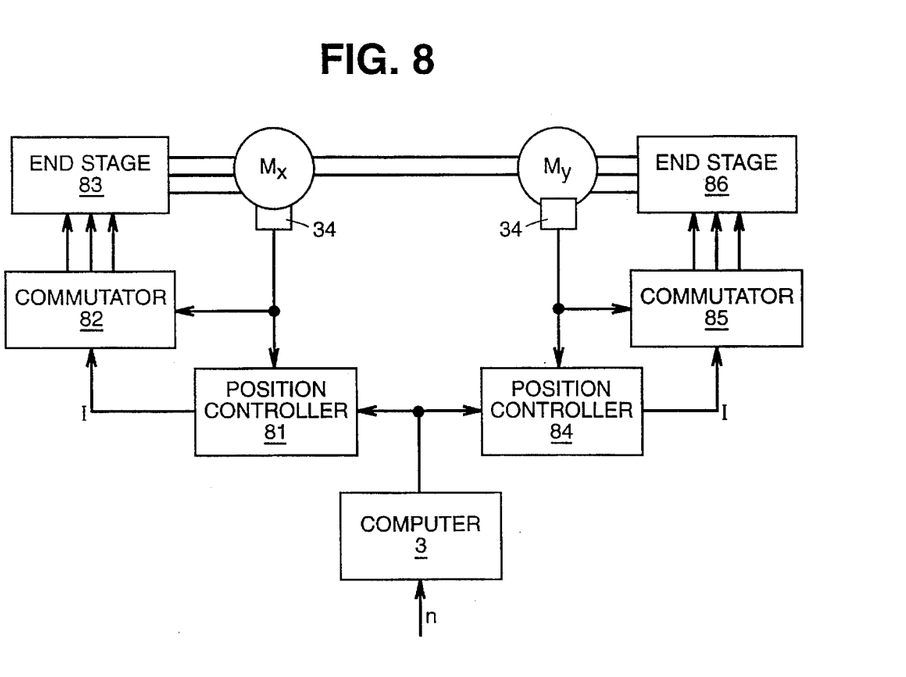
FIG. 8 shows an example of a control for two independently controlled drive motors on the same drafting arrangement.

FIGS. 6 to 8 show various examples of advantageous control of two drive motors acting on the same cylinder with strict maintenance of synchronism, without risk of the two motors working against one another.

In FIG. 6, two motors $M_x$, $M_y$ are connected in series, but a position pick-up 34 is provided on motor $M_x$ only. The pick-up 34 acts on the position controller 31 and on the downstream electronic commutator 62, as described e.g. in connection with FIG. 3. The end stage 63 following the commutator 62 feeds the two series-connected motors $M_x$, $M_y$. This embodiment is particularly suitable for very small torsion angles, e.g. for relatively short cylinders on the drafting arrangement.

FIG. 7 shows a more developed embodiment. Two Motors $M_x$, $M_y$ are fed by separate end stages 71, 72 each having an upstream electronic commutator 73, 74 respectively. In accordance with the master-slave control principle, a single position controller 75 is readjusted only by the first motor $M_x$ in respect controller 75 acts on both electronic commutators 73, 74, thus ensuring that both motors $M_x$, $M_y$ generate the same torque.

FIG. 8 shows another embodiment using two completely controlled motors $M_x$, $M_y$. Starting from a position computer 3, a first position controller 81 is provided for independently controlling the first motor $M_x$ via an electronic commutator 82 and an end stage 83, while a second position controller 84, via an electric commutator 85, serves a second end stage 86, to which the second motor $M_y$ is connected.

Figure 9:
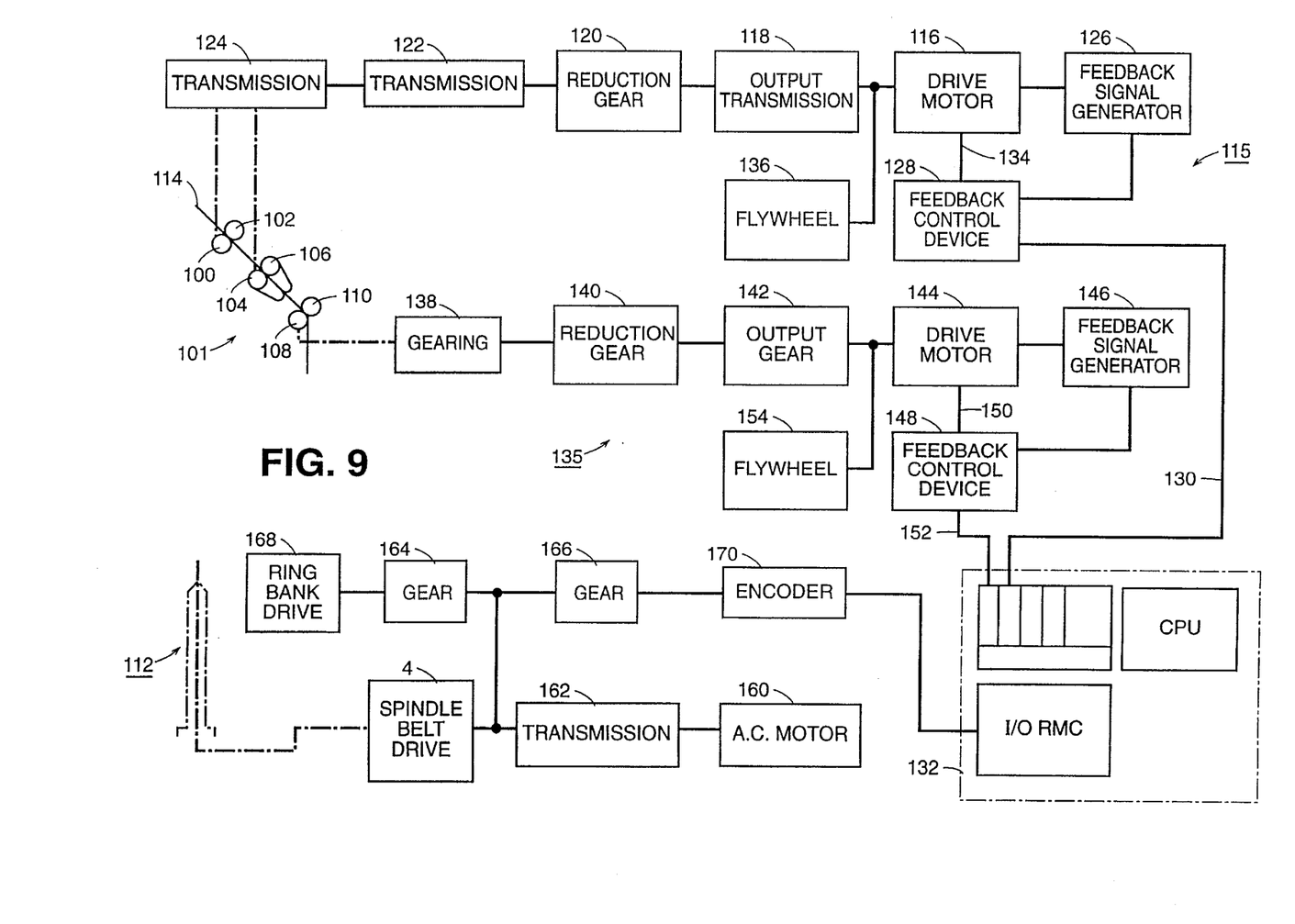
FIG. 9 schematically illustrates a control for a drafting arrangement with the invention.

FIG. 9 diagrammatically shows a drafting arrangement 101 with a break draft zone between an infeed cylinder 100 (with top roll 102) and middle cylinder 104 (with top roll 106), and a main draft zone between middle cylinder 104 and delivery cylinder 108 (with top roll 110). Although not apparent from FIG. 9, each of the cylinders 100, 104 and 108 extends along the whole length of the machine past a row of spinning units one of which is diagrammatically illustrated as a spindle 112. The spinning units could comprise spinning elements, for example air jet devices than spindles. The top rolls 102, 106, 110 are associated with respective spinning units. The drafting arrangement 101 receives a fiber strand 114 from a suitable supply (not shown) and delivers the strand in attenuated form to the spinning unit 112.

The cylinders 100, 104 are driven from at least one end of the machine by a drive arrangement 115 comprising a drive motor 116 with an output transmission 118, a reduction gear 120 and a transmission 122, 124. The second element 124 of the latter transmission determines the speed relationships of the cylinders 100, 104 (and thus the magnitude of the break draft).

The drive arrangement 115 further comprises a feedback signal generator 126 coupled to the motor shaft and a feedback control device 128 receiving the output signal from the generator 126, comparing it with a set value supplied via a line 130 from a central control unit 132 and providing a corresponding output signal on line 134 to modify the condition of the motor 116 so as to bring the output of generator 126 into accordance with the set value. The control device 128 is preferably adapted for four-quadrant operation. The drive arrangement 115 may optionally include a flywheel 136 but this is not essential. The drive arrangement 115 may be duplicated at the other end of the same cylinder pair 100, 104 with the same set value being supplied to both drive arrangements.

The delivery cylinder 108 is driven by at least one further drive arrangement 135 which is similar to the arrangement 115 but without the mechanical gearing 124. This arrangement 135 comprises gearing 138 coupled to the cylinder 108, a reduction gear 140, an output gear 142 of a drive motor 144, a feedback signal generator 146, a feedback control device 148 receiving the output signal of the generator 146 and supplying a control signal for the motor 144 via line 150, a line 152 providing a respective set value from the central control unit 132 and (optionally) a flywheel 154. The drive arrangement 135 can also be duplicated at the other cylinder end. For simplicity of description, it will be assumed that only arrangements 115, 135 as illustrated are necessary to ensure the required operating conditions.

It will be seen that the main draft is determined by two regulated motors (servomotors) 116, 144. These motors can be alternating current motors (synchronous or asynchronous motors), direct current motors of conventional types or brushless d.c. motors. The motor output characteristic sensed by the feedback signal generator 126 or 146 may be the output speed (rpm)—giving a speed-regulated motor— or the angular position of the output shaft, giving a position regulated motor. In the preferred arrangement, at least one of the motors 116, 144 is a position-regulated motor, but even the use of two speed-regulated motors (each with its own feedback loop from output to input) will bring significant advantages.

In the illustrated arrangement, where each motor receives an independently determined set value, each motor is preferably a position regulated motor. Each motor then preferably has a respective encoder or resolver associated with its output shaft and the feedback signal generator 126 or 146 provides a signal representing the position of the motor shaft (relative to same predetermined reference) as given by the encoder or resolver.

Figure 10:
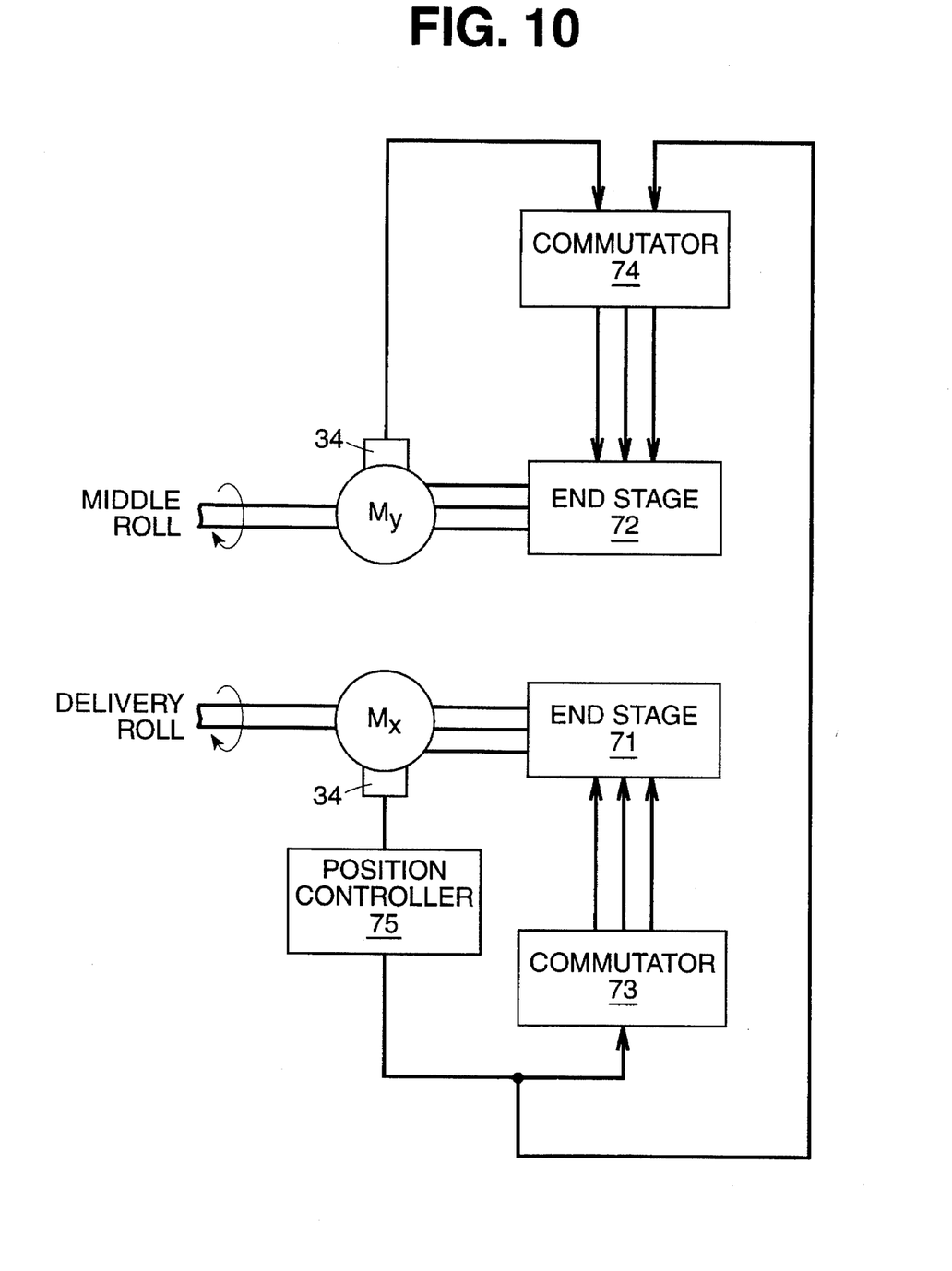
FIG. 10 schematically illustrates a further modified drive arrangement in accordance with the invention.

In an alternative arrangement as shown in FIG. 10, wherein like reference characters indicate like parts as above, one drive arrangement may be driven by a "master" motor $M_x$ and the other may be driven by a "slave" motor $M_y$. The set value for the "slave" motor $M_y$ is then not derived from the central control but from and encoder associated with the "master" motor $M_x$. In this case, the master motor $M_x$ can be a speed regulated motor fitted with an encoder 34 which is not used in feedback control of the master motor itself but to provide a set value for a position regulated slave motor $M_y$. The speed regulated motor is then preferably used to drive the delivery cylinder 108 of a drafting arrangement so that the middle cylinder 104 of the drafting arrangement is forced to follow the position of the delivery cylinder 108.

In a manner similar to the embodiment described above and illustrated in FIG. 7, the master motor $M_x$ and the slave motor $M_y$ are fed by separate end stages 71, 72 each having an upstream commutator 73, 74, respectively. In accordance with the master-slave control principle, a single position controller 75 is readjusted only by the master motor $M_x$ while also acting on both electronic commutators 73, 74 thus ensuring that both motors $M_x$, $M_y$ generate the same torque.

The form of controlled input to the respective drive motor depends on the design of that motor and the performance it is desired to achieve. In general terms, it will be necessary to control the power input to the motor to enable its appropriate response to sensed deviations from the desired (set) condition. This response must take account of the load applied to the motor and the required speed of response, representing acceleration of the motor.

The preferred motor type is the brushless dc motor for reasons already described above. This type of motor inherently comprises a shaft (rotor) position sensing system to enable electronic commutation so that it is also ideally suited to use in conjunction with a position controlling feedback loop. However, the use of this type of motor is not essential to the achievement of a position controlled drive arrangement.

FIG. 9 also shows a drive for the spindle given by way of example as the spinning unit 112. This drive comprises, for example, an ac motor 160 coupled to a variator gear transmission 162 which drives, for example, a 4-spindle belt drive as is well known in the art of ring spinning. Alternative well known ring spinning spindle drive systems involve tangential belts driving a row of spindles. However, it would also be possible to provide each spindle with its own independent drive motor and to control the energy supply to these motors to give a desired spindle speed. Such systems have been proposed for example by SKF (IMDS-Systems) and Asea Brown Boveri (MAS-System) and were demonstrated at the International Textile Machinery exhibition in Paris in 1987.

However, the drive arrangement is not limited to use with "spindle-based" spinning units. In the case of an air jet spinning system, for example as currently offered by the Murata company, the spinning unit comprises air jets which do not involve rotating mechanical parts. The principles of this invention are equally applicable to drafting arrangements for use in such spinning machines.

In FIG. 9 the output of the variator is also passed via a suitable intermediate gear 164, 166 on the one hand to a ring bank drive 168 and on the other hand to an encoder 170 which supplies a signal to the central control unit indicating the spindle speed. If the spindle speed is controlled directly from the central control unit, this latter link may be unnecessary unless monitoring or feedback control is desired. The ring bank can also be driven independently if required, and is of course unnecessary where the spinning system does not call for rings or equivalent devices for imparting twist and for building packages.

The invention thus provides a control arrangement in which synchronization between a drafting arrangement and a main drive is accurately obtained by a position-controlled brushless D.C. motor driving the drafting arrangement and combined with microprocessor control by the main drive and with a mechanical flywheel mass.

The invention further represents an extension of a control arrangement as described in European Patent Application No. 89106269.4 and corresponding U.S. patent application Ser. No. 336,160, filed Apr. 10, 1989, to the drafting arrangements of spinning machines.

What is claimed is:

1. In a textile machine, the combination of a drafting arrangement including a rotatable delivery cylinder and a rotatable middle cylinder;

a speed controlled master motor connected to said delivery cylinder to rotate said delivery cylinder;

a controller connected to said motor to energize said motor;

an encoder for sensing a rotational position of said motor during energization thereof and for generating an actual-position signal in dependence thereof;

a position-regulated slave motor connected to said middle roller to rotate said middle roller and being connected to said encoder to receive said actual-position signal therefrom for adjusting said slave motor in dependence on the position of said master motor to maintain a predetermined rotational positional relationship between said motors and said cylinders.

* * * * *